United States Patent [19]

Lake

[11] 4,389,901
[45] Jun. 28, 1983

[54] FLUID FLOW METER
[75] Inventor: Jack E. Lake, Racine, Wis.
[73] Assignee: Racine Federated Inc., Racine, Wis.
[21] Appl. No.: 263,680
[22] Filed: May 14, 1981
[51] Int. Cl.³ .............................................. G01F 1/22
[52] U.S. Cl. ................................................. 73/861.58
[58] Field of Search ............ 73/861.53, 861.54, 861.58
[56] References Cited
U.S. PATENT DOCUMENTS

| | | | |
|---|---|---|---|
| 1,499,839 | 7/1924 | Nicholson . | |
| 2,311,181 | 2/1943 | Bowen . | |
| 2,325,884 | 4/1943 | Schorn . | |
| 2,370,634 | 3/1945 | Brewer . | |
| 2,439,614 | 4/1948 | Schramm . | |
| 2,459,689 | 1/1949 | Dickey et al. | 73/861.54 |
| 2,574,866 | 11/1951 | Fahrlander . | |
| 2,638,582 | 5/1953 | Ruso et al. . | |
| 2,655,041 | 10/1953 | Jacobsson . | |
| 3,182,501 | 5/1965 | Haase | 73/861.53 |
| 3,196,673 | 7/1965 | Carson . | |
| 3,218,853 | 11/1965 | Ongaro . | |
| 3,398,305 | 8/1968 | Brewer . | |
| 3,554,031 | 1/1971 | Turner . | |

Primary Examiner—Herbert Goldstein

[57] ABSTRACT

A fluid flow meter having a transparent housing and a piston movable within the housing for indicating the rate of flow of fluid through the housing in accordance with the position of the piston relative to a scale on the housing. Fins are disposed within the housing to receive the fluid entering the housing and to induce the fluid to have a steady and laminar flow and thus present a steady force on the piston for accurate flow readings. A spring urges the piston toward the inlet, and a spring seat is adjustably disposed within the housing so that the spring force on the piston can be readily calibrated and thus the spring will exert the desired force on the piston so that accurate flow readings can be obtained. The entire meter is made of only a minimum number of parts but there is required accuracy and also opportunity to observe the flow through the transparent meter housing.

12 Claims, 5 Drawing Figures

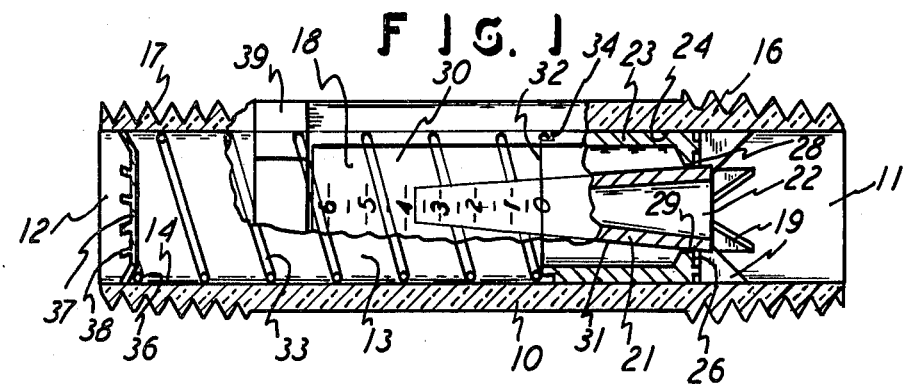
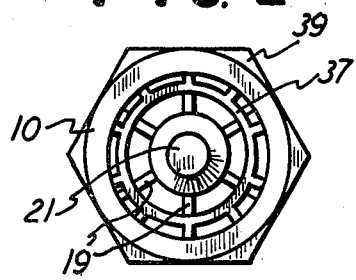
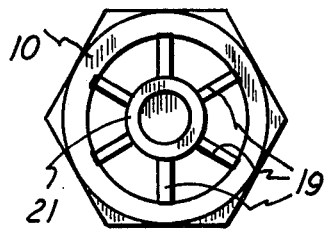
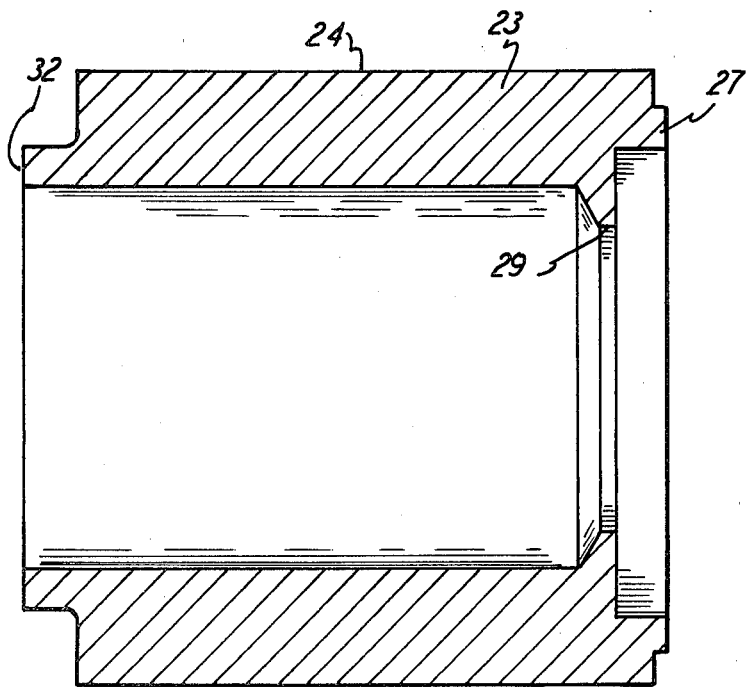
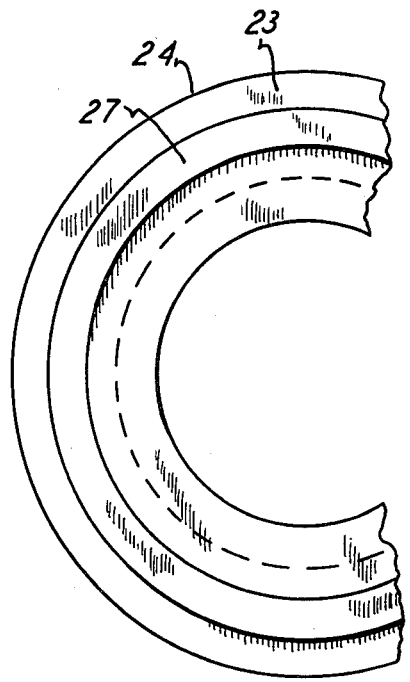

FLUID FLOW METER

This invention relates to a fluid flow meter, and, more particularly, it relates to a flow meter of a transparent housing type which permits direct reading of the rates of flow of fluid through the meter.

BACKGROUND OF THE INVENTION

Fluid flow meters are well known in the prior art and they exist in various forms and constructions. The prior art flow meters commonly have a piston which is displaced in accordance with the rate of flow through the meter, and it is old to have the housing of a transparent material so that the position of the piston can be observed and thus the rate of flow determined. Examples of such prior art are found in British Pat. No. 928,319 and in U.S. Pat. Nos. 2,311,181 and 2,370,634 and 2,439,614, and 2,655,041 and 3,196,673. However, those prior art patents are of structures significantly different from the one disclosed herein, in that the prior art structures have their so-called piston members floating, rather than spring-urged and operating over a fixed cone, as in the present invention.

The prior art is also aware of flow meters which utilize a remote type of indicator, such as a pointer and dial or the like, and U.S. Pat. Nos. 1,499,839 and 2,325,884 and 2,574,866 and 3,398,305 show that type of flow meter structure and it differs from the present invention which utilizes a spring-urged piston which can be seen through a transparent housing for determining the rate of flow.

Still another group of prior art patents is U.S. Pat. Nos. 2,638,582 and 3,218,853 and 3,554,031 shows meters or valves which have pistons slidable in a conical housing, but they do not relate the piston to a transparent housing through which the position of the piston can be seen and thus the rate of flow determined.

All of the aforementioned prior art patents differ from the present invention in that the present invention has the spring-urged piston slidable in a cylindrical housing of transparent material and there are fins on the upstream side of the flow in the housing so that the flow can become steady and laminar and thus create a steady force on the piston for the desired accurate reading. Further, the present invention has an adjustable seat for the spring which urges the piston, and thus the spring can be put under proper tension and therefore it is in the nature of calibrating the spring for the particular meter installation and characteristics of that individual spring, and thus, again, an accurate flow rate reading can be obtained by this means which differs from the prior art. Still further, the present invention differs from the aforesaid prior art in that it is made of only a minimum number of pieces and thus there is no requirement for elaborate interfitting of parts and there is no requirement for extensive assembly proceedings as there is with the prior art structures such as those mentioned above. Still another prior art patent is U.S. Pat. No. 3,805,611 which employs a spring-urged movable piston operating on a conical member and having a cylindrical housing interior and with the position of the piston itself indicating the rate of flow through the meter. However, for the reasons mentioned in this paragraph, the present invention also distinguishes over U.S. Pat. No. 3,805,611, that is, the present invention has the flow fins, the adjustable spring seat, and the minimal number of parts. That prior art flow meter has twenty-two pieces compared to five pieces required for the present flow meter, for example. Therefore, the present meter is less subject to failure of parts, and there is significantly less requirement for fitting the parts one to another and thus the meter can be an accurate meter with less manufacturing expense and attention, and, significantly, the present meter does not rely upon the use of a magnet, as with U.S. Pat. No. 3,805,611 for the reading of the position of the piston within the housing.

There are other objects and advantages, and those will become apparent upon a reading of the following description in light of the accompanying drawings.

BRIEF DESCRIPTION OF THE DRAWINGS

FIG. 1 is a longitudinal sectional view through a preferred embodiment of a flow meter of this invention.

FIG. 2 is a left end elevational view of the meter shown in FIG. 1.

FIG. 3 is a right end elevational view of the meter shown in FIG. 1.

FIG. 4 is an enlarged sectional view of the piston shown in FIG. 1.

FIG. 5 is a right end elevational view of a fragment of the piston shown in FIG. 4.

DETAILED DESCRIPTION OF THE PREFERRED EMBODIMENT

The improved flow meter of this invention has a housing 10 which is of a transparent material, such as suitable plastic, and an inlet 11 and a fluid outlet 12 and an intermediate chamber 13 extending between the inlet 11 and the outlet 12 and all are in fluid flow communication. There is a cylindrical interior wall 14 extending throughout the length of the housing 10, and the inlet end and the outlet end of the housing 10 have threaded lengths 16 and 17, respectively, for connecting to fluid flow lines directing the flow to and from the meter shown.

It will be therefore understood that the housing 10 is transparent and the parts that are on the interior of the housing can be readily seen, even when fluid is flowing through the meter. Thus, FIG. 1 shows the fragmentary section with the housing exterior surface or wall 18 extending over a frontal portion of the meter as shown, but it will be seen that the interior of the housing 10 can still be seen beneath that housing wall fragment 18. A plurality of triangularly shaped fins 19 are disposed within the housing interior at the inlet 11 and are disposed also in the longitudinal plane of the housing 10 and thus they extend planarly in the direction of the flow through the meter. That is, fluid entering the inlet 11 will encounter the fins 19 which are in the path of the incoming fluid and which are planar and disposed in the direction of the fluid flow. With that arrangement, the flow entering the meter will encounter the plurality of fins 19, and six fins are shown equally spaced around the interior of the housing 10, and the fluid will therefore be directed longitudinally of the housing 10, rather than in turbulence or swirling toward the cylindrical wall of the housing 10. The fins serve to calm any turbulent flow and to create a steady or laminar flow directed in the longitudinal direction of the cylindrical housing 10.

A conical member 21 is coaxially disposed in the housing 10 and has its larger end 22 adjacent the fins 19 and thus the conical member 21 tapers downwardly toward the outlet 12. The housing 10 and fins 19 and conical member 21 can all be molded in one plastic mold so that they constitute one unitary piece and thus there is no need for assembly or interfitting or adjustment of the respective parts mentioned. Of course the smaller end of the conical member 21 is not open but is actually blocked, as shown in FIG. 2, and thus the flow does not go through the conical member 21 but instead goes around the conical member 21 after passing the fins 19.

A cylindrical and hollow piston 23 is movably disposed within the housing 10, and the outer circumference 24 of the piston 23 is fluid tight with the cylindrical surface or wall 14 of the housing 10 but slides therealong. The piston 23 has its head 26 adjacent the fins 19, and, in the arrangement shown, the piston 23 actually has a circular ridge 27 in abutment with the adjacent edges 28 of the fins 19 which present those six edges 28 on one transverse plane across the housing 10, as shown. It will of course be understood that fluid entering the inlet 11 will pass the fins 19 and will encounter the piston head 26 and, depending upon the rate of flow of fluid at that time, the piston 23 will be urged to the left, as viewed in FIG. 1. Of course the inner circular surface 29 of the piston 23 is in fluid tight contact with the outer conical surface 31 of the conical member 21 when the piston 23 is in the position of FIG. 1, that is, when there is no flow through the meter. However, flow through the meters moves the piston 23 to the left, as mentioned, and thus the piston circular surface 29 is moved out of fluid sealing relationship with the conical member 21, and the degree of movement of the piston 23 is determined by the rate of flow and of course by the angle of the cone on the conical member 21, all as will be fully understood by anyone skilled in the art.

With that arrangement, the fins 19 are in contact with the piston 23 in the commencement position shown in FIG. 1, and thus the incoming flow is produced as steady or laminar flow and is immediately directed onto the piston head 26 so that the piston 23 receives a steady force for an accurate reading of the rate of flow. The reading is accomplished by provision of a scale 30 which is affixed to the housing 10 and which itself is transparent and which of course has graduations thereon, such as those shown ranging from zero to six in the drawing. The piston 23 has its planar end surface 32 aligned with the zero position in the "no flow" condition shown in FIG. 1, and then additional readings taken as the piston 23 moves to the left will be made by observing the position of the piston leading or planar surface 32 with respect to the scale 30. Actually the scale 30 can either be a transparent piece, with the graduations thereon, affixed to the exterior of the housing 10, or it can be printed or engraved on the housing 10, or any other manner. In any event, the point is that both the scale 30 and the housing 10 are transparent, and thus the piston leading planar surface 32 can be readily seen and thus its position can be accurately observed during the course of flow of fluid through the meter.

A compression spring 33 is disposed in the housing 10 and has one end 34 abutting the piston 23 and it has its other end 36 abutting a spring seat 37. Thus the spring 33 urges the piston 23 to the right, as viewed in FIG. 1, and that of course is in the direction against the force applied by the flow through the meter. Of course with the appropriate graduations on the scale 30 and with the appropriate spring force applied to the piston 23, the accurate readings can be obtained.

In addition to the provision and location of the fins 19 relative to the piston 23, as described above, another important feature is the provision of the spring seat 37, and that is important because the seat is readily adjustable in that it is in the nature of a clip of a cylindrical configuration with retaining teeth 38 in contact with the housing interior wall 14 so that the spring seat 37 is held against movement to the left, under normal actions in the meter, but the seat 37 can be readily slid to the right, all as viewed in FIG. 1, and thus the seat 37 is adjustable and therefore the force created by the spring 33 can be adjusted or calibrated as desired. FIG. 2 shows the elevational view of the spring seat 37, and it shows that the projections 38 are in the nature of spring prongs which secure themselves against the housing interior wall 14, especially when the housing 10 is made of a plastic material which permit the prongs 38 to somewhat embed themselves in the material to the degree necessary to retain the seat 37 in the desired longitudinal position along the housing 10. Of course the adjustable seat 37 is basically a ring member having the radially projecting prongs 38, so it in no way interferes with flow through the meter, and it is not moved by flow itself. FIG. 2 also shows the end view of the conical member 21, as mentioned above, and it shows the 6 fins 19, and that view therefore is only of the body part 10 and the spring seat part 37, and the spring 33 and the piston 23 are removed.

Likewise, FIG. 3 shows the end elevational view of the body 10 only, and there is no showing of the piston 23 and the spring 33 nor is there any showing of the spring seat 37.

FIGS. 4 and 5 show the details of the piston 23, including ring 27 which abuts the fins 19 which therefore serve as a stop for the piston 23, and FIGS. 4 and 5 also show the hollow interior of the piston 23. Further, FIGS. 1, 2, and 3 show that the body 10 has a hexagonal section designated 39, and thus a wrench can be used for connecting the housing 10 with fluid flow lines which would be at opposite ends of the housing 10 but which are now shown herein.

The entire arrangement is for a simplified but yet adjustably accurate flow meter, and this is accomplished by means of having only five pieces constituting the entire meter. Further, the fins 19 and piston 23 are immediately adjacent each other, and thus the steady and laminar flow is directed immediately to the piston 23, and the adjustable spring seat 37 permits the desired calibration so that the steady flow can be utilized and the force of the spring can be arranged to provide for the accurate flow readings desired.

What is claimed is:

1. In a fluid flow meter comprising a housing of a transparent material and having a fluid inlet and a fluid outlet and having a cylindrical wall defining a hollow interior, a conical member secured on the interior of said housing, a piston movably disposed in said housing and slidable along said cylindrical wall of said housing and having a central opening piloted on said conical member for movement of said piston in accordance with the rate of flow of fluid through said housing and toward said outlet, a spring for urging said piston toward said inlet, a scale on said housing and matched with said piston for indicating the rate of flow of fluid, the improvement comprising a plurality of fins extending between said housing and said conical member adjacent said fluid inlet and in the path of the flow of fluid into said housing and toward said piston, to direct the fluid to flow in a laminar flow pattern as contrasted to a turbulent flow pattern and to direct the laminar flow onto said piston and thereby create steady flow-sensing positions for said piston.

2. The fluid flow meter as claimed in claim 1, wherein said piston and said fins are adjacent each other and at one end of said conical member when there is no flow through said housing.

3. The fluid flow meter as claimed in claim 1 or 2, wherein said fins are disposed in contact with said piston, when there is no flow through said housing, and said fins thereby present an end stop for said piston in the no-flow position.

4. The fluid flow meter as claimed in claim 1 or 2, wherein said fins are affixed to both said housing and said conical member for mounting said conical member on the cylindrical axis of said housing.

5. The fluid flow meter as claimed in claim 1 or 2, wherein said spring extends along the cylindrical axis of said housing, a spring seat disposed in said housing and located at the end of said spring opposite said piston and being movably disposable for adjustably applying the spring force onto said piston and thereby calibrate the force in accordance with the flow of fluid.

6. The fluid flow meter as claimed in claim 1 or 2, wherein said piston has a planar surface at the end thereof toward said outlet, for alignment of said planar surface with said scale to reveal the rate of flow of fluid through said housing.

7. In a fluid flow meter comprising a housing of a transparent material and having a fluid inlet and a fluid outlet and having a cylindrical wall defining a hollow interior, a conical member secured on the interior of said housing, a piston movably disposed in said housing and slidable along said cylindrical wall of said housing and having a central opening piloted on said conical member for movement of said piston in accordance with the rate of flow of fluid through said housing and toward said outlet, a spring for urging said piston toward said inlet, means operatively associated with the position of said piston for indicating the rate of flow of fluid, the improvement comprising a plurality of fins extending between said housing and said conical member adjacent said fluid inlet and in the path of the flow of fluid into said housing and toward said piston, to direct the fluid to flow in a laminar flow pattern as contrasted to a turbulent flow pattern and to direct the laminar flow onto said piston and thereby create steady flow-sensing positions for said piston, said spring extending along the cylindrical axis of said housing, and a spring seat disposed in said housing and located at the end of said spring opposite said piston.

8. The fluid flow meter as claimed in claim 7, wherein said spring seat is movably disposably engaged with said housing for adjustably applying the spring force onto said piston and thereby calibrate the force in accordance with the flow of fluid.

9. The fluid flow meter as claimed in claim 7 or 8, wherein said piston and said fins are adjacent each other and are at one end of said conical member when there is no flow through said housing.

10. The fluid flow meter as claimed in claim 7 or 8, wherein said fins are disposed in contact with said piston, when there is no flow through said housing, and said fins thereby present an end stop for said piston in the no-flow position.

11. The fluid flow meter as claimed in claim 7 or 8, wherein said fins are affixed to both said housing and said conical member for mounting said conical member on the cylindrical axis of said housing.

12. The fluid flow meter as claimed in claim 7 or 8, wherein said piston has a planar surface at the end thereof toward said outlet, for alignment of said planar surface with said scale to reveal the rate of flow of fluid through said housing.

* * * * *